(12) United States Patent
Raffo

(10) Patent No.: US 7,793,271 B2
(45) Date of Patent: Sep. 7, 2010

(54) BI-DIRECTIONAL PRODUCT DEVELOPMENT PROCESS SIMULATION

(75) Inventor: David M. Raffo, Tigard, OR (US)

(73) Assignee: State of Oregon acting by and through the State Board of Higher Education on behalf of Portland State University, Portland, OR (US)

( * ) Notice: Subject to any disclaimer, the term of this patent is extended or adjusted under 35 U.S.C. 154(b) by 1271 days.

(21) Appl. No.: 11/155,325

(22) Filed: Jun. 16, 2005

(65) Prior Publication Data

US 2006/0101383 A1  May 11, 2006

Related U.S. Application Data

(60) Provisional application No. 60/580,856, filed on Jun. 17, 2004.

(51) Int. Cl.
*G06F 9/44* (2006.01)
*G06F 9/45* (2006.01)

(52) U.S. Cl. ................ 717/135; 717/104; 717/124; 703/22

(58) Field of Classification Search ............ 717/100, 717/104–105, 124–135; 703/22
See application file for complete search history.

(56) References Cited

U.S. PATENT DOCUMENTS

| | | | | | |
|---|---|---|---|---|---|
| 5,488,713 | A | * | 1/1996 | Norton et al. | 703/22 |
| 5,694,539 | A | * | 12/1997 | Haley et al. | 714/38 |
| 5,857,071 | A | * | 1/1999 | Haley et al. | 714/38 |
| 6,289,502 | B1 | * | 9/2001 | Garland et al. | 717/104 |
| 7,117,484 | B2 | * | 10/2006 | Hartman et al. | 717/126 |
| 7,174,286 | B2 | * | 2/2007 | Martin et al. | 703/22 |
| 7,302,677 | B2 | * | 11/2007 | Reissman et al. | 717/135 |
| 7,349,837 | B2 | * | 3/2008 | Martin et al. | 703/22 |
| 7,363,600 | B1 | * | 4/2008 | Ballagh et al. | 716/3 |
| 2001/0037492 | A1 | * | 11/2001 | Holzmann | 717/4 |
| 2002/0133329 | A1 | * | 9/2002 | Kano et al. | 703/22 |

(Continued)

OTHER PUBLICATIONS

Raffo, David, "Evaluating the Impact of Process Improvements Quantitatively using Process Modeling," Oct. 1993, IBM Press, p. 290-313.*

(Continued)

*Primary Examiner*—Wei Y Zhen
*Assistant Examiner*—Qing Chen
(74) *Attorney, Agent, or Firm*—Klarquist Sparkman, LLP

(57) ABSTRACT

A bi-directional software development process simulation model is described. The model simulates the stages of a software development process, using equations relating to defect injection and detection and parameters describing detection and injection rates. With forward development process simulation, predictions can be made for process outcomes. By simulating in the reverse direction, defect detection requirements can be found for each stage of the model to achieve a desired performance result. Outcome-based control levels are utilized with the model to better detect whether a process is out of control. By going between the forward and reverse simulation directions, control of the process can be fine-tuned as defect detection data is obtained during process execution. In addition to quality as measured by defects, other metrics can be simulated, including cost, time, and features; similarly other product development scenarios, such as hardware or systems engineering can also be modeled and simulated.

20 Claims, 10 Drawing Sheets

U.S. PATENT DOCUMENTS

| | | | |
|---|---|---|---|
| 2002/0170037 A1* | 11/2002 | Powell | 717/131 |
| 2004/0059962 A1* | 3/2004 | Robertsson | 714/38 |
| 2004/0221260 A1* | 11/2004 | Martin et al. | 717/104 |
| 2005/0131667 A1* | 6/2005 | Woodring | 703/22 |

OTHER PUBLICATIONS

Raffo, David M., "Capturing Software Process and Product Characteristics in Process Models Using Task Element Decomposition," Oct. 1994, IBM Press, p. 1-15.*

Wild et al., "Finding Stable System Designs: A Reverse Simulation Technique," Oct. 1994, ACM, p. 87-98.*

Lee et al., "Single Run Optimization Using the Reverse-Simulation Method," 1997, p. 187-193.*

Raffo et al., "Software Process Decision Support: Making Process Tradeoffs Using a Hybrid Metrics, Modeling and Utility Framework," Jul. 2002, ACM, p. 803-809.*

Raffo et al., "Supporting Software Process Decisions Using Bi-Directional Simulation," Oct. 2003, International Journal of Software Engineering and Knowledge Engineering, p. 513-530.*

* cited by examiner

Example of a Forward Software Development Process Simulation Model

Example of a Reverse Software Development Process Simulation Model

Fig. 6a

| Defect Injection and Detection Rates | | |
|---|---|---|
| Life Cycle Phase | Injection Rate (% total defects) | Detection Capability |
| Requirements Specification | 12.3% | 56.1% |
| High Level Design | 15.2% | 19.9% |
| Low Level Design | 25.0% | 23.6% |
| Coding | 44.8% | 17.2% |
| Unit Test | 1.5% | 54.2% |
| Functional Test | 1.1% | 72.5% |
| System Test | 0.2% | 66.4% |

Fig. 6b

| Defect Multiplier Values | |
|---|---|
| Phases Where Multiplier was used | MULT |
| Between REQ and HLD | 4 |
| Between HLD and LLD | 2 |
| Between LLD and CODE | 4 |

Fig. 6c

| Outcome Based Control Limits | | |
|---|---|---|
| | OBCL (Less than 75% of the time) | Baseline Expected |
| Percentage of defects released to customer. | 3.25% | 2.89% |
| Number of Defects to be released | 50.70 | 45.10 |
| Number of Defects to be released (using Phase Multiplier Model) | 188.8 | 167.9 |

Fig. 6d

| Forward Simulation Results for the Baseline Model | | | |
|---|---|---|---|
| | Mean | STD DEV | Coef. of Var. |
| Number of defects Delivered to the customer | 45.10 | 8.29 | 0.184 |
| Number of defects Delivered to the customer (Using Phase Multipliers) | 168.56 | 30.44 | 0.181 |
| Probability of Achieving OBCL with current process (Must be at least 75% in order to meet OBCLs) | 74.69% | | |

Fig. 6e

| Inspection & Test Effectiveness Required to Meet OBCLs | | |
|---|---|---|
| | Insp & Test Effectiveness by Phase | |
| Life Cycle Process Phase | Mean | Std. Dev. |
| Requirements Specification | 36.7% | 26.7% |
| High Level Design | -1.8% | 31.2% |
| Low Level Design | 8.1% | 20.4% |
| Coding | 3.0% | 19.8% |
| Unit Test | 46.6% | 9.7% |
| Function Test | 68.6% | 4.2% |
| System Test | 61.5% | 6.3% |

*Assumes initial expected values for other phases

Fig. 6f

| Probability System Will Meet OBCL at Specified Level of Insp & Test Effectiveness | | | | | | | |
|---|---|---|---|---|---|---|---|
| | Inspection & Test Effectiveness | | | | | Expected Efficiency Probability | Expected Insp & Test Efficiency by Phase |
| | 0% | 25% | 50% | 75% | 100% | | |
| Requirements Specification | 8.5% | 33.1% | 69.1% | 92.4% | 99.1% | 76.6% | 56.1% |
| High Level Design | 52.3% | 80.5% | 95.2% | 99.3% | 99.9% | 75.7% | 19.9% |
| Low Level Design | 34.6% | 79.6% | 98.0% | 99.9% | 100.0% | 77.6% | 23.6% |
| Coding | 44.0% | 86.7% | 99.1% | 100.0% | 100.0% | 76.4% | 17.3% |
| Unit Test | 0.0% | 1.3% | 63.7% | 99.8% | 100.0% | 78.0% | 54.1% |
| Function Test | 0.0% | 0.0% | 0.0% | 93.6% | 100.0% | 82.5% | 72.5% |
| System Test | 0.0% | 0.0% | 3.4% | 98.4% | 100.0% | 77.9% | 66.4% |

Fig. 6g

| Process Performance with 92 Defects Detected at Requirements Specification | | |
|---|---|---|
| | Mean | STD DEV |
| Number of defects Delivered to the customer | 179.1 | 33.9 |
| Probability that 188.8 defects or less will be delivered to the customer | 61.3% | |

Fig. 6h

| Probability System Will Meet OBCL at Specified Level of Insp & Test Effectiveness (REQ Defected =92) | | | | | | | |
|---|---|---|---|---|---|---|---|
| | Inspection & Test Effectiveness | | | | | Expected Efficiency Probability | Expected Insp & Test Efficiency by Phase |
| | 0% | 25% | 50% | 75% | 100% | | |
| High Level Design | 39.6% | 71.6% | 92.0% | 98.8% | 99.9% | 65.6% | 19.9% |
| Low Level Design | 21.6% | 68.8% | 96.1% | 99.9% | 100.0% | 66.2% | 23.6% |
| Coding | 30.7% | 81.1% | 98.8% | 100.0% | 100.0% | 67.5% | 17.3% |
| Unit Test | 0.0% | 0.7% | 51.2% | 99.4% | 100.0% | 67.0% | 54.1% |
| Function Test | 0.0% | 0.0% | 0.0% | 87.5% | 100.0% | 70.2% | 72.5% |
| System Test | 0.0% | 0.0% | 1.7% | 96.7% | 100.0% | 68.0% | 66.4% |

Fig. 6i

| Probability Project will Achieve OBCL if Average Inspection Effectiveness is 35% | |
|---|---|
| | Probability Project will Achieve OBCLs |
| High Level Design | 85.87% |
| Low Level Design | 87.38% |
| Coding | 96.32% |

BI-DIRECTIONAL PRODUCT DEVELOPMENT PROCESS SIMULATION

CROSS REFERENCE TO RELATED APPLICATION

This application claims priority from U.S. Provisional Application No. 60/580,856, filed Jun. 17, 2004, both of which are incorporated herein by reference in their entirety.

TECHNICAL FIELD

The invention relates generally to simulation and control of product development, including software, hardware, and systems engineering.

BACKGROUND

Certain types of product development fall into certain patterns of use over time. As those patterns are discovered and studied, simulation models are oftentimes developed which provide structure and guidance to developers. One particular example of such a patterned and studied scenario is software and systems development.

Software development is understood both to be well suited to modeling and to being facilitated by consultation of models as development proceeds. Because software is frequently designed and studied in the abstract, and then coded and tested, the development process lends itself to a discretized pattern that can more easily be represented in simulation than other more heuristic types of development. One example of simulation models that typify the ability to break down a software development process can be found in the generalized software process simulation models of U.S. patent application Ser. No. 10/838,494, which is herein incorporated by reference.

Academic work has been done on the development of simulation models for software development processes. Existing systems for software development simulation, however, while attempting to provide useful metrics of such types as time, quality, cost, and features of a particular development project, are somewhat myopically focused on prediction of end results. This is quite useful at the beginning of a project, when developers must determine their ability to meet deadlines, deliver product of a certain quality, or stay below cost. However the focus on end results does not always provide information of the particular granularity or specificity required for decision-making during a software development project. Thus, if a developer or manager suspects that a project may not be performing as successfully as desired, and even if he or she can measure how far off course the project is, existing systems do not provide information necessary for that person to find a suitable place in the remaining project stages to change course and how much of a correction to make.

Additionally, existing systems, many of which are based on statistical process control ("SPC"), do not always provide an easy measure of whether or not a project is performing satisfactorily or not. This is because, while SPC has proven useful in many statistically-appropriate development environments, software presents problems that make typical SPC methods not very helpful in measuring the success of an ongoing project. SPC methods rely on past development data in order to provide statistically-based control limits for a project; seeing that a given metric for a project has gone outside of those control limits indicates that the project is "out of control" and thus must be corrected. % However, software does not always provide the uniformity of data that is required to create useful control limits. Typically, in a typical manufacturing application, one operation is repeated many times, and data are stratified by operator, activity, and machine. This wealth of data provides control limits that a manufacturer can be confident in and use. However, software development frequently involves such variation of task, operator, and tools that it can be difficult or impossible to gain data and stratify it to create proper control limits. Thus, software control limits, created by typical SPC methods, can vary from ±15% of mean performance to limits that range from 0% to 400% of the mean. This variation in control limits is too large to be useful to developers. An SPC-controlled project could report that it is "consistent" with past performance (i.e. that it is within the control limits) and yet could be performing unacceptably from a manager's standpoint, if the limits happen to be exceedingly wide.

What is needed is a system that provides practical information to determine the success of ongoing projects while also providing data which can indicate, in the event that a project is out of control, where resources should be reallocated to put the project back into control.

BRIEF DESCRIPTION OF THE DRAWINGS

FIGS. 6a-6i illustrate exemplary data from an exemplary bi-directional software development process simulation model measuring an exemplary quality metric.

DETAILED DESCRIPTION

The following description is directed to techniques and systems for providing bi-directional software development process simulation models ("bi-directional models") using outcome-based control limits ("OBCLs"). The description presents an exemplary application of this technique in a computer system. In one implementation, the bi-directional models simulate the execution of stages of a software development process in both a forward and backward direction. In one implementation, the bi-directional model measures defect rates and is able to determine the rate of defect escape when simulating in a forward direction. When simulating in a reverse direction, the bi-directional model provides expected results from each stage of the process given a particular expected outcome as an input. A user of such a simulation model can both determine if a process is going out of control by simulating in a forward direction, and, if a different result than what is predicted is desired, discover through reverse simulation the required performance at each development stage to achieve a desired end performance. This allows a user a greater degree of insight into and control over a software development project.

The techniques described herein are performed, in one implementation, with reference to outcome-based control limits. The use of outcome-based control limits, in one implementation, identifies targets for project performance and acceptable ranges of performance for the overall project. Thus, a project manager can set a performance target (e.g., a maximum acceptable number of defects) as well as the probability with which that target must be satisfied. A project is thus said to be "out of control" when its predicted performance will fall outside of OBCL targets.

While the descriptions below focus on the specific example of software engineering, including conception, requirements analysis, design, development, and testing, the systems and techniques described herein are applicable to other fields which utilize similar engineering processes. Thus, the systems and techniques described herein can be modified to provide bi-directional models for such activities as hardware and systems engineering, and other product development and engineering that utilizes processes similar to those discussed herein. Additionally, while descriptions below focus on modeling for a quality metric, other metrics, such as time, cost, or features can be modeled in alternative implementations.

1. Illustrated Implementation of Bi-Directional Model System

Figure 1:
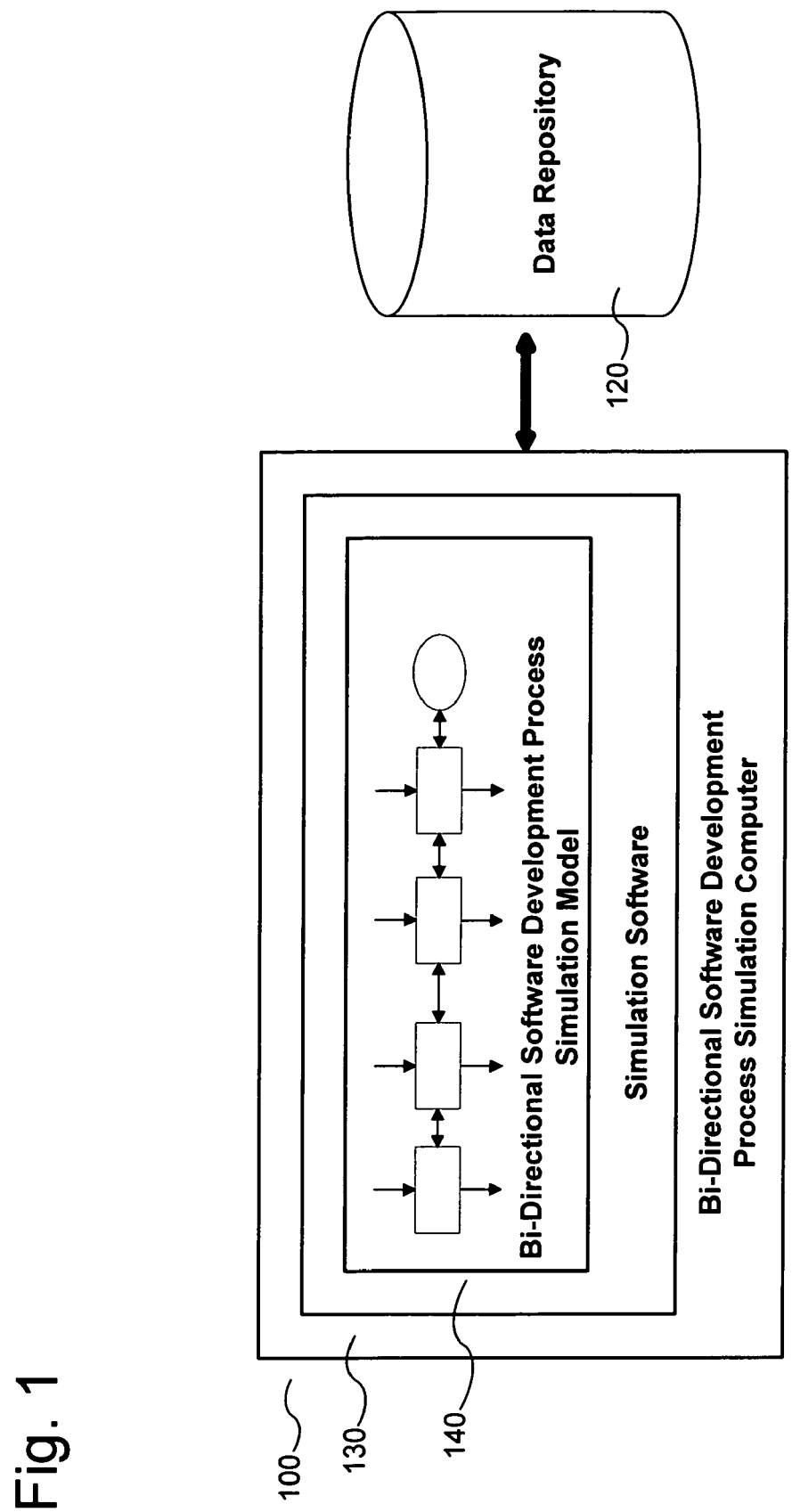
FIG. 1 is a block diagram illustrating, in one implementation, exemplary components of a system for implementing bi-directional software development process model simulation.

FIG. 1 illustrates one implementation of components of a system providing software development project simulation through the use of bi-directional models. In the illustrated implementation, the bi-directional model system comprises a model and software running on a bi-directional software development process simulation computer 100. As will be described below, in various implementations the bi-directional software development process simulation computer 100 can comprise various forms and computing environments, including personal computers and servers.

FIG. 1 also illustrates a data repository 120. In one implementation, this database contains information useful to simulations of software development, such as, but not limited to, cost statistics, defect injection rates, and manpower requirements. In another implementation, the database 120 contains results of software development simulations, such as project cost, or project quality. In yet another implementation, the data repository is configured to record performance data results or requirements of development stages as they are developed during simulation. In various implementations, the data repository 120 can comprise, for example, a database, a networked server, or a hard drive. More examples of simulation parameters and simulation results are given below.

Figure 2:
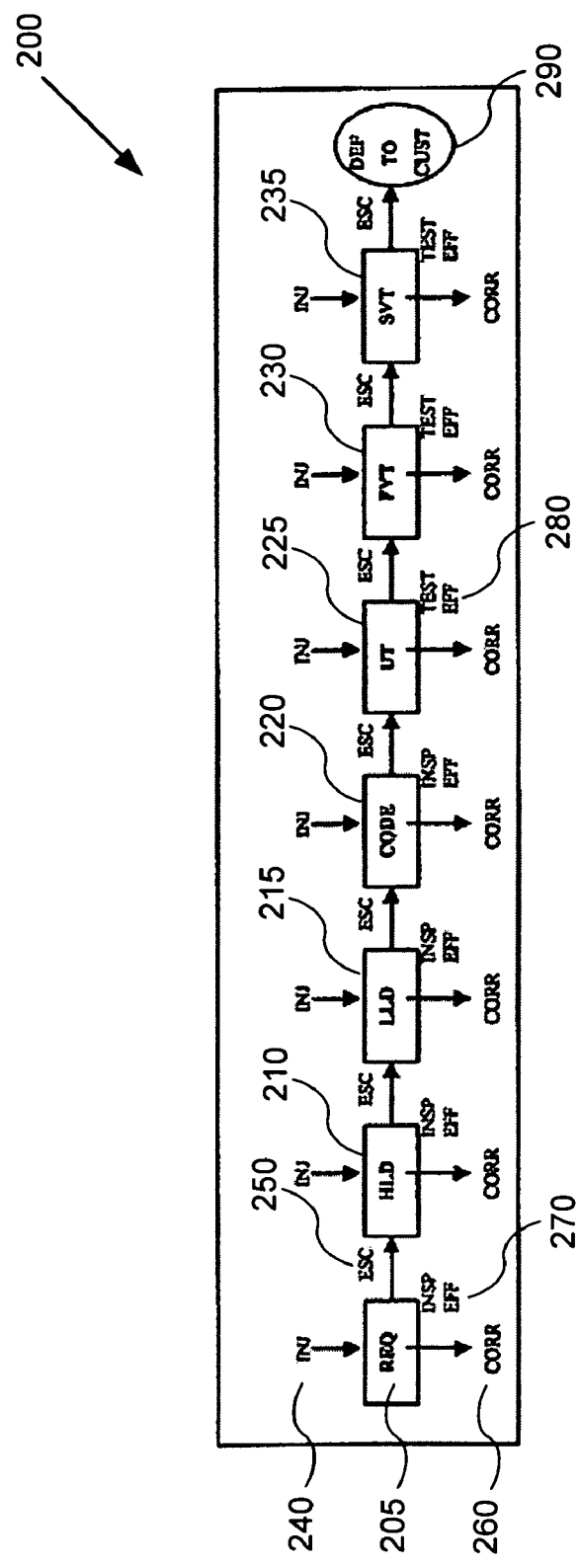
FIG. 2 is a block diagram illustrating an exemplary forward software development process simulation model for an exemplary quality metric.
Figure 3:
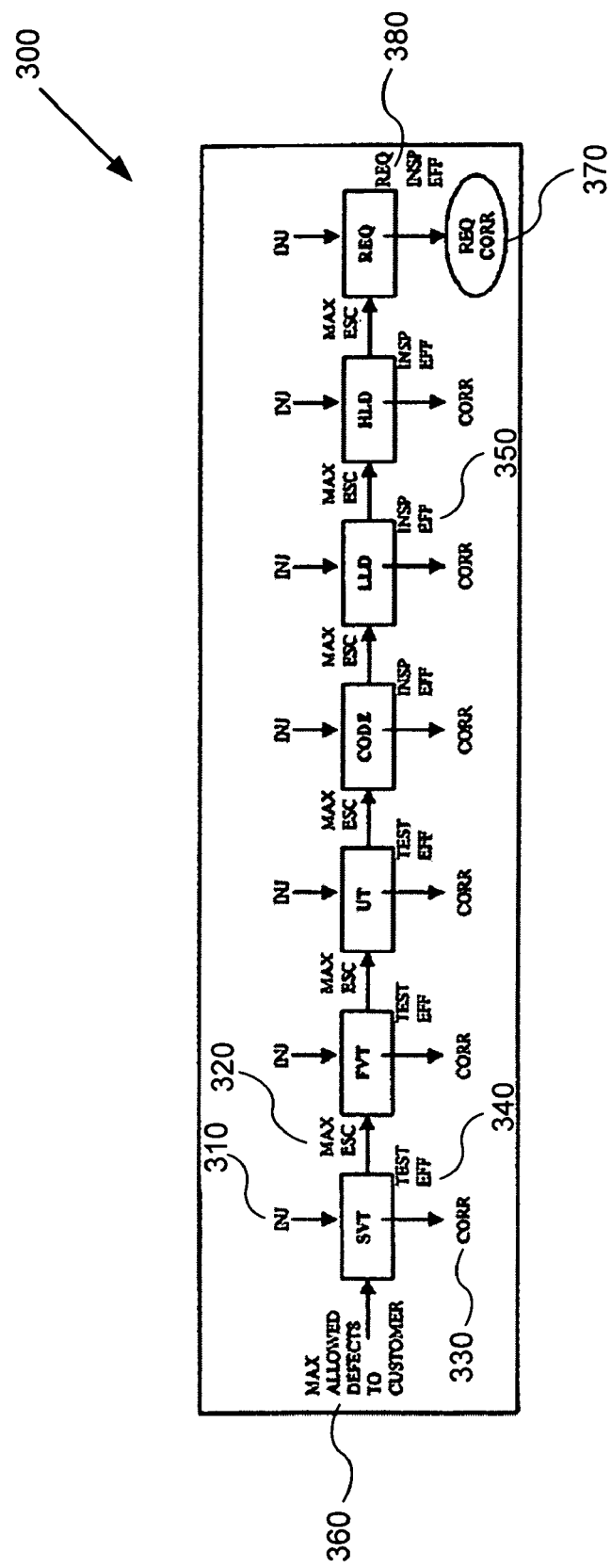
FIG. 3 is a block diagram illustrating an exemplary reverse software development process simulation model for an exemplary quality metric.

FIG. 1 illustrates simulation software 130 and a bi-directional software process simulation development model 140 executing within the bi-directional software development process simulation computer 100. In one implementation, the simulation software 130 comprises a modeling and simulation tool, such as the Extend tool by Imagine That!, which provides an environment for manipulating simulation blocks representing software development processes and relating the blocks to each other to create a valid model. In this implementation, the bi-directional model 140 can comprise such blocks, combined to create the model. In one implementation, one or more blocks comprise generic software modeling blocks of the type described in U.S. patent application Ser. No. 10/838,494. In alternate implementations, the bi-directional model 140 and simulation software 130 are integrated into software modules and are not separated along simulation software/model lines. In one such implementation, the combined software 130 and model 140 can comprise a stand-alone application. While the bi-directional model 140 of FIG. 1 is shown as a single model capable of simulation in two directions, in another implementation, the bi-directional model is divided into two separate models, one for forward simulation and one for reverse. FIGS. 2 and 3 will give examples of such bifurcated models.

2. Examples of Models

FIG. 2 illustrates a example of one implementation of a forward simulation model as part of a bi-directional model for an exemplary quality metric. While the example in FIG. 2 is based on a modified waterfall process, in other implementations, other software process models may be used, including, but not limited to, the rational unified process model, the spiral model, rapid prototyping, and the IEEE 12207 software development standard. FIG. 2 illustrates a simulation model used to measure quality by measuring defects that are passed from stage to stage. In other implementations, bi-directional models can be created which operate on other metrics, such as time, cost, or features. One purpose of forward simulation models, such as the one illustrated in FIG. 2, is to represent a project as it evolves forward in time, and to be used along with OBCLs to determine if a project will achieve a desired level of performance.

FIG. 2 illustrates a model 200 with the following life cycle phases: Requirements Specification (REQ 240), High Level Design (HLD 210), Low Level Design (LLD 215), Coding (CODE 220), Unit Test (UT 225), Functional Verification Test (FVT 230), and System Verification Test (SVT 235). FIG. 2 also illustrates defect parameters which are used to record and track: the number of defects injected (e.g. introduced) into the project at each stage (INJ 240), the number of defects which escape to the next stage (ESC 250), the number of defects detected and corrected (CORR 260), and the inspection or test effectiveness, or percentage of latent defects detected and corrected at each phase (INSP EFF 270 or TEST EFF 280). At the end, the forward simulation model is able to determine the number of defects delivered to the customer (DEF TO CUST 290).

In one implementation, the model 200 depicted in FIG. 2 operates on the defect parameters through the use of defect equations. An exemplary set of forward simulation equations follows:

$$INJ\_DEF_i = INJ\_RT_i * DPK * KLOC \quad \text{(Eq. 1)}$$

$$DET\_DEF_i = (INJ\_DEF_i + ESC_{i-1}) * INSP\_EFF_i \quad \text{(Eq. 2)}$$

$$ESC_i = INJ\_DEF_i + ESC_{i-1} - DET\_DEF_i \quad \text{(Eq. 3)}$$

$$ESC_0 = 0 \quad \text{(Eq. 4)}$$

$$ESC_{SVT} = \text{Defects released to the customer} \quad \text{(Eq. 5)}$$

For the purposes of these equations: KLOC refers to the size of the software project in thousands of lines of code, DPK is the total number of defects injected into the software over the life of the project per each KLOC, $INJ\_RT_i$ is the percentage of total defects injected at stage i, $INJ\_DEF_i$ is the number of defects injected at stage i, $ESC_i$ is the number of defects that escape detection at stage i, $INSP\_EFF_i$ (or $TEST\_EFF_i$, where applicable to the stage) is the percentage of latent defects in the code at stage i that are detected and corrected, $DET\_DEF_i$ is the number of defects that are detected and corrected at phase i, and $ESC_{SVT}$ is the number of defects released to the customer.

FIG. 3 illustrates a reverse simulation model 300 as part of the same bi-directional model as FIG. 2. In contrast to the forward simulation model of FIG. 2, one purpose of the reverse model is to represent the system beginning with a desired end state and simulating the process back to the starting point, representing the capacity of the system to produce the desired end state. In doing so, required capacities of the intermediate process steps can be identified. FIG. 3 includes parameters similar to those in FIG. 2; INJ 310 is the number of defects injected at each stage, MAX ESC 320 is the maximum allowable number of defects that can escape from the previous development phase as derived from the input OBCLs and the expected inspection and test effectiveness levels, CORR 330 is the number of defects detected and corrected at each phase, and INSP EFF 340 and TEST EFF 350 (depending on the phase) are the percentage of latent defects detected and corrected at each phase. The "MAX ALLOWED DEFECTS TO CUSTOMER" 360 holds the number of defects allowed to be delivered to a customer. REQ CORR 370 and REQ INSP EFF 380 are the final calculated levels of corrected errors and inspection effectiveness that are needed in order to achieve the OBCLs.

In one implementation, reverse simulation models, such as illustrated in FIG. 3, also operate on defect parameters through the use of defect equations. Frequently those are developed from the forward simulation equations, which are more directly derived from the model itself. In one example, a set of equations for the reverse simulation model are:

$$INJ\_DEF_i = INJ\_RT_i * DPK * KLOC \quad (Eq. 6)$$

$$DET\_DEF_i = (ESC_{i-1}) / ((1-INSP\_EFF_i) * INSP\_EFF_i) \quad (Eq. 7)$$

$$ESC_{i-1} = DET\_DEF_i + ESC_i - INJ\_DEF_i \quad (Eq. 8)$$

$$INSP\_EFF^* = \max(0, (INJ\_DEF_i - ESC_i) / INJ\_DEF_i) \quad (Eq. 9)$$

$$ESC_{SVT} = OBCL * DPK * KLOC \quad (Eq. 10)$$

The variables for the reverse simulation model follow the same description as for the forward simulation model except that $ESC_{SVT}$ in the reverse simulation situation can be defined as the number of defects allowed to escape as set by the OBCL. Additionally, the reverse simulation model uses the variables $INSP\_EFF_i$ (or $TEST\_EFF_i$, where applicable to the phase), which is the inspection or test effectiveness required to achieve the OBCLs at an intermediate stage.

Additionally, in another implementation, it is recognized that early-injected defects can be more costly to repair than later ones and create more defects in later stages. Thus, in one implementation, multipliers are included to account for this extra cost. So, in one implementation, equations 2 and 3 and 8 can be modified as follows:

$$DET\_DEF_i = (INJ\_DEF_i + ESC_{i-1} * MULT) * INSP\_EFF_i \quad (Eq. 2)$$

$$ESC_i = INJ\_DEF_i + (ESC_{i-1} * MULT) - DET\_DEF_i \quad (Eq. 3)$$

$$ESC_{i-1} = (DET\_DEF_i + ESC_i - INJ\_DEF_i) / MULT \quad (Eq. 8)$$

3. Using Bi-Directional Models

Figure 4:
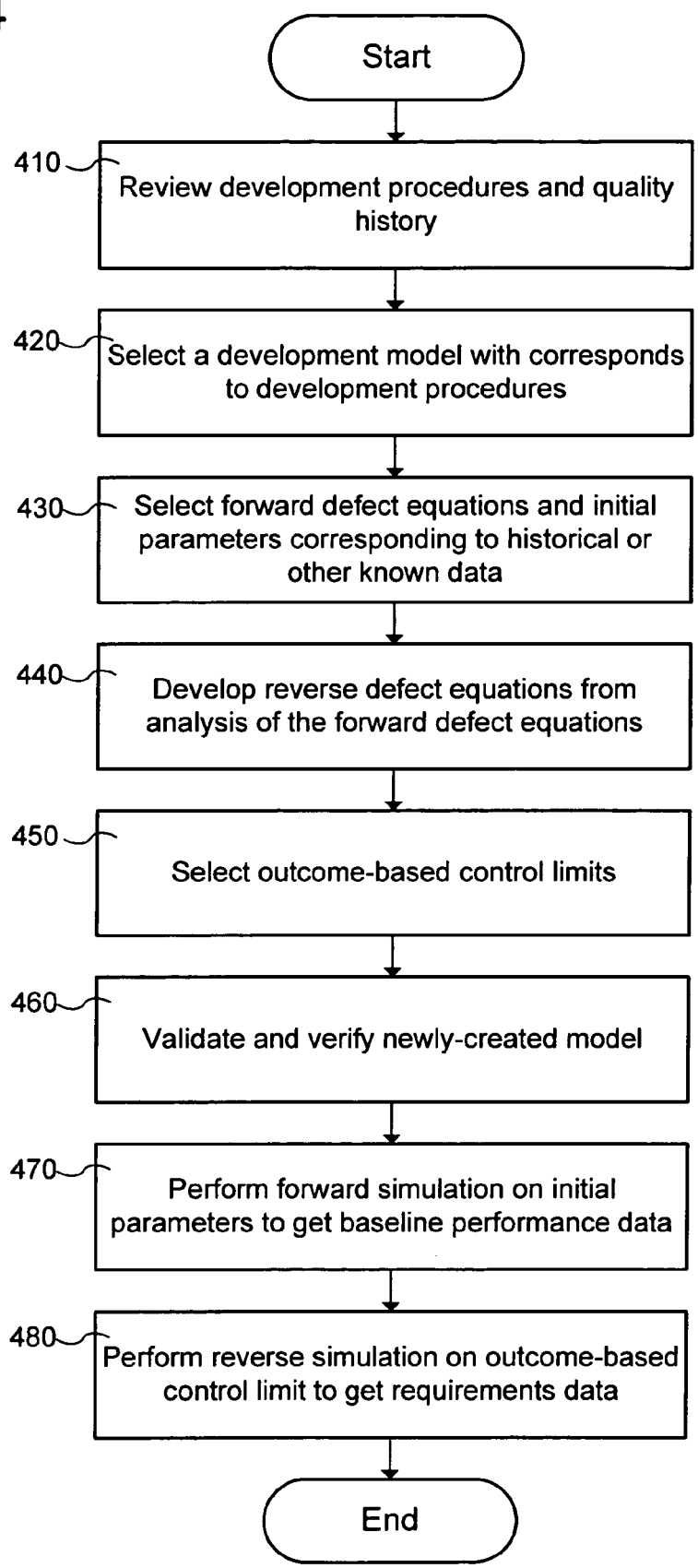
FIG. 4 is a flowchart illustrating, in one implementation, a process for creating a bi-directional model and obtaining baseline performance and requirements data for an exemplary quality metric.

FIG. 4 illustrates an exemplary process for crafting a bi-directional model for a given software development process and using it to obtain baseline performance and requirements data from which predictions and comparisons can be made. While alternate implementations can use different metrics, the example of FIG. 4 is based around a quality metric. In alternate implementations, the processes of FIG. 4 may be omitted, combined, or divided into separate subprocesses.

The process begins at block 410, where the procedures of the development process are reviewed along with the quality history of that process. In one implementation, this review can include the gathering of data from past efforts of the developer, or even from outside academic or industry research. In one implementation, this data may already be stored in the data repository 120. Next, at block 420, a model is selected which corresponds to the development procedures. In one implementation, this process involves selecting and modifying a pre-made software development process simulation model, such as a generalized software process simulation model; in another a model is made from scratch, such as with generic software modeling blocks. In yet another, an initial model may be selected from a library of existing models.

Next, at block 430, forward defect equations and initial parameters are selected which correspond to historical or other known data for the development process. In one implementation, these equations and parameters may be widely known as the result of academic or industry research. In another, they may be internally-kept and based on past practices of the particular software developer. Next, at block 440, reverse defect equations are developed from the forward defect equations. In one implementation, this process comprises reviewing the forward defect equations to determine how they may be "inverted," creating equations such as equations 6-10 above, which produce corrected defect and inspection and testing efficiency numbers based on OBCLs. In another, reverse defect equations may be obtained from academic or industry research along with forward defect equations.

Next, at block 450, outcome-based control limits are selected. In one implementation, these limits may be based on an analysis of the customer's needs, marketing research, experience, or any combination of these and/or other factors. Typically, the OBCLs will include both a maximum allowable number of defects, as well as a target percentage for how often this target defect number will be fulfilled. Thus, in one example, a manager could set a goal of having no more than 3.25% of injected defects released to customers 75% of the time.

The process then continues to block 460, where the newly-created model is validated and verified to determine that it properly simulates the software development process for which it has been created. In one implementation, this process involves running simulations using the bi-directional model to ensure that it accurately represents the procedures reviewed in block 410 and that it accurately represents any results received so far in past development. Next, at block 470, the bi-directional model is used to perform a forward simulation. Through doing this, the forward defect equations and defect parameters are used to develop an expected performance for software development process. This expected performance can then be used as a baseline during future development. Lastly, a reverse simulation is performed on the selected OBCLs to get requirements data. As will be seen later, this results in data for expected efficiencies and defects corrected for each stage of the model; these too can be used as baseline numbers.

Figure 5:
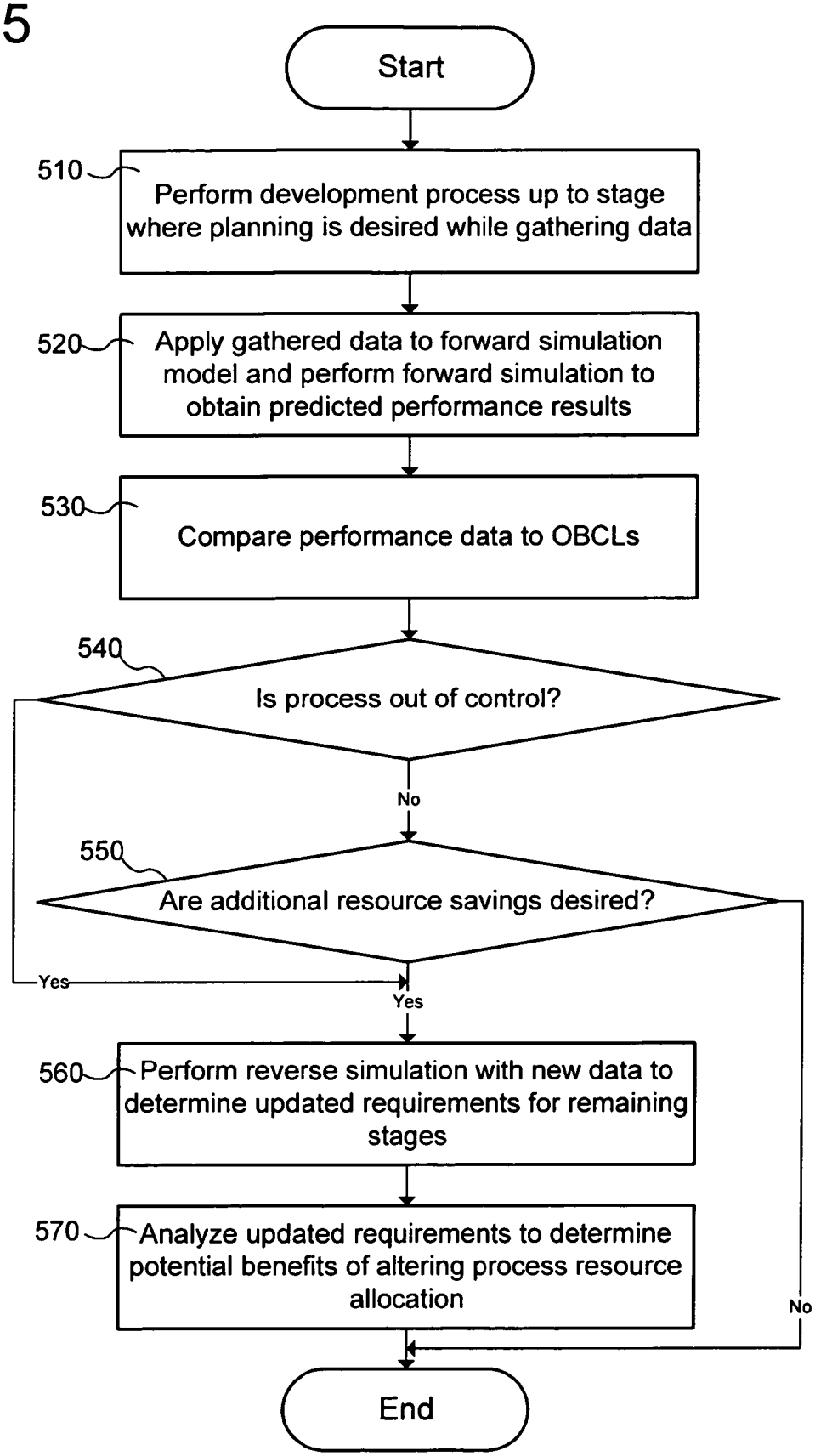
FIG. 5 is a flowchart illustrating, in one implementation, a process for utilizing a bi-directional model for control of a software development process.

FIG. 5 illustrates an exemplary process for utilizing a bi-directional model to control a software development process. While alternate implementations can use different metrics, the example of FIG. 5 is based around a quality metric. In alternative implementations, the processes of FIG. 5 may be omitted, combined, or divided into separate subprocesses. The process begins at block 510, where software development is performed and continued and while data on the success of each stage is gathered, up to the point where planning is desired. In one circumstance, it may be that a manager wishes to perform a routine time- or milestone-based review. In another, planning may be desired because it is suspected or known that a particular development stage did not perform as well as had been expected, and it is necessary to see if the project is on track and if corrective steps need to be taken. In yet another circumstance, a stage may have gone very well and more defects may have been found than was previously expected, and a manager may wish to find a stage which can be treated more lightly than was planned in order to save resources or get ahead of schedule. In one implementation, the data gathered in the process of block 510 includes the number of defects discovered and corrected at each stage.

Next, at block 520, the gathered data is applied to the forward simulation model and a forward simulation is performed to obtain an updated prediction of performance results. In one implementation, the gathered data is substituted for the historical defect parameters used to create the model and from which the baseline performance data was obtained. Next, at block 530, the updated performance data just obtained is compared to the OBCLs. Then, at decision block 540, it is determined if the comparison shows that the process is out of control. If it is determined that the process is not out of control, the process of FIG. 5 continues to decision block 550, where it is determined if additional resource savings are desired. If no additional resource savings are desired, then the process of FIG. 5 ends at this point and no further planning is necessary. In one implementation, the process of FIG. 5 is repeated later for a different stage. However, if it was determined at decision block 540 that the process is out of control, or if it is determined at decision block 550 that additional resource savings are desired, the process continues to block 560.

At block 540, a new reverse simulation is performed using the newly-gathered data along with the original OBCLs. In doing this, updated requirements for the remaining process stages are obtained. In one implementation, the reverse simulation needs only be performed back to the point that the software process has been performed; there is no additional need to run the simulation for stages that have been executed, as the data gained may not add much insight. Finally, at block 570, the updated requirements are analyzed to determine potential benefits of altering resource allocation on the remaining stages of the software development process. In one implementation, this may be performed by a manager comparing the data to determine which stage would add the most benefit for the least cost in resource addition or reallocation. In another, historical data describing the cost of adding additional resources to development stages may be considered, as well. In yet another, software may be utilized which determines the best stages in which to reallocate resources, or which even uses historical data to make such a decision.

4. Examples of Data Used with and Derived from Bi-Directional Models

FIGS. 6*a-i* illustrate nine exemplary data tables created or used by one exemplary simulation for an exemplary software development project of 52 KLOC using a bi-directional model corresponding to the models illustrated in FIGS. 2 and 3. FIG. 6*a* illustrates one example of injection rate and detection capability percentages for the stages of the exemplary bi-directional model. In one implementation, data such as this can be gained through historical data gathered by the software developer. In another, the data is obtained from academic or industry research. In yet another, data is gained through inspection of development processes.

FIG. 6*b* illustrates potential multiplier values, such as could be used in the modified defect equations 2, 3, and 8 listed above. As in FIG. 6*a*, these multipliers can be obtained through historical data, research, inspection, or even through general non-quantitative experience of the developer.

FIG. 6*c* illustrates OBCLs for the exemplary software process. In FIG. 6*c*, managers have determined a goal of having no more than 3.25% of injected defects released to the customer no more often than 25% of the time. In other words, at least 75% of the time, at least 96.75% of the injected defects should be discovered before product release. Given an overall defect injection rate (the average of the rates of FIG. 6*a*) of 30 defects/KLOC, this means there is a maximum number of defects of 50.7. When the multipliers are included, this results in a maximum number of released defects of 188.8. FIG. 6*c* also includes one calculation of expected defects for a baseline model, obtained by performing a forward simulation using the parameters from FIG. 6*a*, including the number of defects expected to be delivered to the customer.

FIG. 6*d* illustrates another set of forward simulation results for the baseline model, which differ slightly from those in FIG. 6*c* due to rounding errors and differences in random number generation. Additionally, FIG. 6*d* illustrates the standard deviation and the coefficient of variation for the baseline results, assuming that the number of defects follows a normal distribution. Using standard statistical methods, a probability of achieving the OBCL given this mean can be calculated; this is illustrated in FIG. 6*d* as well.

FIGS. 6*e* and 6*f*, by contrast, show the results of a reverse simulation, using the OBCLs as a performance goal. FIG. 6*e* shows the distribution of inspection and test effectiveness levels required at each development stage to achieve the OBCL, assuming every stage is performing exactly as is expected. Because the OBCL actually allows more defects to be released than are expected in the baseline, the mean expected effectiveness for each stage is actually lower than the baseline historical detection capability illustrated in FIG. 6*a*. Comparing these two sets of data illustrates that resources could be moved off of one or more stages if desired while still staying within OBCLs. FIG. 6*e* also illustrates that the High Level Design stage is particularly unhelpful, and could be eliminated entirely with the process performing in control, as long as the other stages performed up to their expected detection capabilities. Using data such as FIG. 6*e*, a manager can easily see potential benefits of reallocating resources before a project has begun.

FIG. 6*f* illustrates implications of the data in FIG. 6*e* by performing forward simulations to determine the probability of meeting OBCLs given different effectiveness levels at each stage. Thus, if the inspection effectiveness for the coding stage were increased from to 25%, the process would meet OBCLs 86.7% of the time, an improvement over the 75% desired. This, coupled with FIG. 6*e*, can allow a manager to plan to see how likely a change in the software development process will improve results.

FIG. 6*g* illustrates data that could be obtained with using the bi-directional model for development process control. In the example of FIG. 6*g*, 92 defects were detected and corrected at the Requirements Specification stage and the process has not yet continued past that stage. This corresponds to a 47.9% inspection effectiveness rate, which is lower than the expected rate from FIG. 6*a*. Using traditional SPC models, this change would likely not be discovered. However, when the forward simulation is performed, a mean number of delivered defects of 179.1 is obtained, with a standard deviation of 33.9. Using standard statistical processes, we see that there is now only a 61.3% chance of meeting OBCLs, which is less than the desired 75%; the process is "out of control" and should be corrected.

Thus, a reverse simulation can be performed to identify stages where correction can be taken, and then forward simulation can show the result of various corrective options. FIG. 6h shows these options given the new defect data. FIG. 6h shows that bringing inspection effectiveness of the high level design, low level design, or coding stages up to 25% will bring the process close to, or within OBCLs. FIG. 6i goes further to show the likelihood of meeting OBCLs given 35% effectiveness for those stages, 35% being a realistic improved expectation, according to research. Thus, a manager can see that bringing up any of these stages to 35% effectiveness will bring the development process within OBCLs, allowing him or her to make decisions about resource allocation.

5. Computing Environment

The above described bi-directional software development process simulation model 140 and control and planning techniques can be implemented on any of a variety of computing devices and environments, including computers of various form factors (personal, workstation, server, handheld, laptop, tablet, or other mobile), distributed computing networks, and Web services, as a few general examples. The bi-directional model and control and planning techniques can be implemented in hardware circuitry, as well as in software and data 780 comprising the bi-directional model 140 as well as the simulation software 130 executing within a computer or other computing environment, such as shown in FIG. 1.

Figure 7:
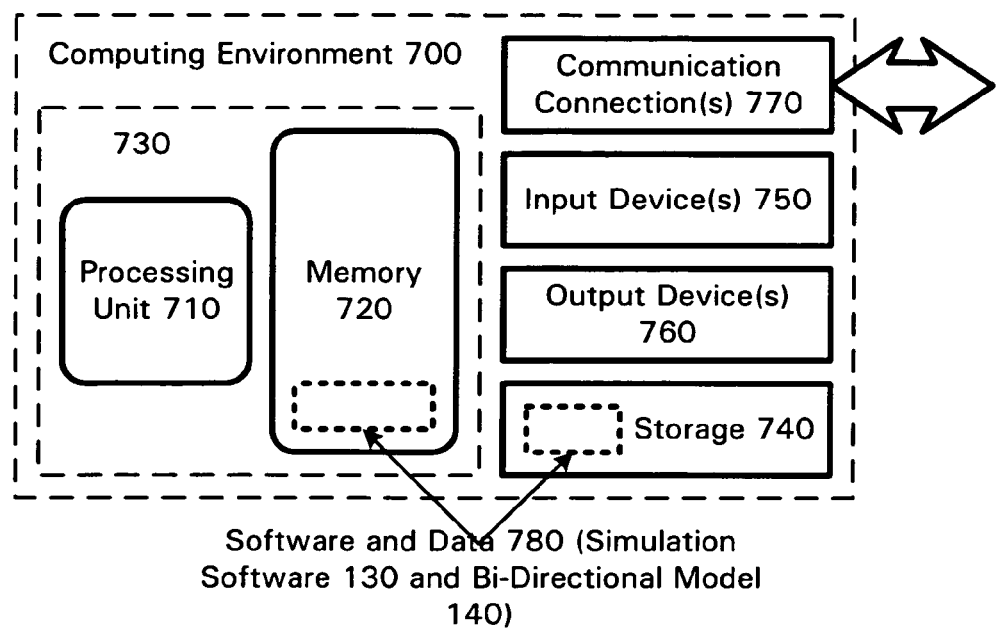
FIG. 7 is a block diagram of a suitable computing environment for implementing the bi-directional software development process simulation model of FIG. 1.

FIG. 7 illustrates a generalized example of a suitable computing environment 700 in which the described techniques can be implemented. The computing environment 700 is not intended to suggest any limitation as to scope of use or functionality of the invention, as the present invention may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing the bi-directional model 140 and simulation software 130.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions and data for the software 780.

The input device(s) 750 (e.g., for devices operating as a control point for the simulation software 130) may be a touch input device such as a keyboard, mouse, pen, or trackball, a voice input device, a scanning device, or another device that provides input to the computing environment 700. For audio, the input device(s) 750 may be a sound card or similar device that accepts audio input in analog or digital form, or a CD-ROM reader that provides audio samples to the computing environment. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The bi-directional model and control and planning techniques herein can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The bi-directional simulation techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," analyze," and "perform" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

I claim:

1. A method of simulating a software development process using a computer configured to perform a software development simulation through analysis of a quality metric, the method comprising:
   selecting a reverse software development process simulation model corresponding to the software development process for the software development simulation on the computer, the reverse software development process simulation model comprising a plurality of software development stages;
   determining defect parameters for the plurality of software development stages of the reverse software development process simulation model;

determining reverse defect equations for the plurality of software development stages of the reverse software development process simulation model;

determining outcome-based control statistics for the software development process;

applying the reverse defect equations to the outcome-based control statistics and the defect parameters to determine control requirements for the plurality of software development stages of the reverse software development process simulation model;

selecting a forward software development process simulation model corresponding to the software development process for the software development simulation on the computer, the forward software development process simulation model comprising a plurality of software development stages, each of the plurality of software development stages of the forward software development process simulation model corresponding to one of the plurality of software development stages of the reverse software development process simulation model;

determining forward defect equations for the plurality of software development stages of the forward software development process simulation model;

applying the forward defect equations to the defect parameters to determine baseline process performance data; and comparing the baseline process performance data to the outcome-based control statistics to determine if the software development process is out of control.

2. The method of claim 1, further comprising:

determining that the software development process is out of control; and analyzing control requirements for the plurality of software development stages of the reverse software development process simulation model to identify one or more software development stages which will improve the baseline process performance data determined from the forward software development process simulation model when the defect parameters for the one or more identified software development stages are improved.

3. The method of claim 2, further comprising:

modifying one or more defect parameters;

applying the forward defect equations to the modified one or more defect parameters to determine modified process performance data; and comparing the modified process performance data to the baseline process performance data to determine how the software development process has been improved.

4. The method of claim 1, wherein determining reverse defect equations comprises modifying the forward defect equations to create reverse defect equations.

5. The method of claim 1, wherein selecting a reverse software development process simulation model comprises modifying the selected forward software development process simulation model to create a reverse software development process simulation model.

6. The method of claim 1, wherein the defect parameters include defect injection rates and the reverse and forward software development process simulation models are configured to accept defect injection rate parameters.

7. The method of claim 6, wherein the defect parameters include inspection effectiveness and test effectiveness and the forward and reverse software development process simulation models are configured to accept inspection effectiveness and test effectiveness parameters.

8. The method of claim 7, wherein each of the plurality of software development stages of the forward software development process simulation model produces performance data representing the number of defects which have escaped detection or correction at that software development stage.

9. The method of claim 8, wherein the baseline process performance data is produced by the last software development stage of the forward software development process simulation model.

10. The method of claim 7, wherein each of the plurality of software development stages of the reverse software development process simulation model accepts a maximum number of defects to be allowed after the simulation of that software development stage and produces a maximum number of defects that could be accepted before simulation of the software development stage as a defect requirement for that software development stage.

11. The method of claim 1, wherein the reverse software development process simulation model comprises a waterfall process model, a rational unified process model, or conforms to an IEEE 12207 process design standard.

12. The method of claim 1, wherein the selected reverse software development process simulation model and forward software development process simulation model comprise generalized software process simulation models.

13. A method for controlling a software development process through analysis of cost, quality, or schedule metrics using a computer configured to perform a software development simulation, the method comprising:

determining outcome-based control limits for the software development process for a cost, quality, or schedule metric;

selecting a bi-directional software development process simulation model which corresponds to the software development process for the software development simulation on the computer, the bi-directional software development process simulation model comprising a plurality of software development stages along with forward and reverse simulation equations;

determining baseline parameters for the bi-directional software development process simulation model;

determining a baseline performance prediction by simulating the software development process using the bi-directional software development process simulation model;

comparing the baseline performance prediction to the outcome-based control limits to determine if the software development process is in control using the baseline parameters;

determining parameter requirements for each software development stage of the bi-directional software development process simulation model based on the outcome-based control limits;

analyzing the parameter requirements to determine one or more software development stages whose parameters, when improved, will improve a performance prediction from the bi-directional software development process simulation model; and modifying one or more parameters.

14. A system for planning and controlling a software development process, the system comprising:

a memory;

a processing unit;

a simulation software residing in the memory and executing on the processing unit, the simulation software being configured to display simulation models, to allow editing of process simulation models, to execute process simulations, and to report simulation performance results;

a bi-directional software development process simulation model comprising a plurality of software development stages and forward and reverse defect equations, the simulation software configured to:
   determine baseline parameters for the bi-directional software development process simulation model;
   determine a baseline performance prediction by simulating the software development process using the bi-directional software development process simulation model;
   compare the baseline performance prediction to outcome-based control limits to determine if the software development process is in control using the baseline parameters;
   determine parameter requirements for each software development stage of the bi-directional software development process simulation model based on the outcome-based control limits; and
   analyze the parameter requirements to determine one or more software development stages whose parameters, when improved, will improve a performance prediction from the bi-directional software development process simulation model; and
a data and parameter repository residing in the memory containing defect parameters and configured to receive simulation performance results.

15. A non-transitory computer-readable medium storing a simulation software and data which, when read by a computer, cause the computer to simulate a software development process by executing:
   a bi-directional software development process simulation model configured to accept defect parameters and produce simulation performance data measured by quality and to accept outcome-based control limits for quality and produce defect requirements, wherein the bi-directional software development process simulation model comprises:
      a plurality of software development stages; and
      forward and reverse defect equations representing interactions between each of the plurality of software development stages; and
   wherein the simulation software is configured to:
      determine baseline parameters for the bi-directional software development process simulation model;
      determine a baseline performance prediction by simulating the software development process using the bi-directional software development process simulation model;
      compare the baseline performance prediction to outcome-based control limits to determine if the software development process is in control using the baseline parameters;
      determine parameter requirements for each software development stage of the bi-directional software development process simulation model based on the outcome-based control limits; and
      analyze the parameter requirements to determine one or more software development stages whose parameters, when improved, will improve a performance prediction from the bi-directional software development process simulation model.

16. A method of controlling a software development process through analysis of cost, quality, or schedule metrics using a computer, the method comprising:
   analyzing the software development process to create outcome-based control limits for one or more selected metrics, the outcome-based control limits representing acceptable levels for the one or more selected metrics at the outcome of the software development process;
   creating a bi-directional software development process simulation model, the bi-directional software development process simulation model comprising:
      a plurality of software development stages configured to represent the stages of the software development process;
      baseline simulation parameters for the one or more selected metrics; and
      forward and reverse simulation equations configured to accept metric parameters and produce predictive simulation data for the one or more selected metrics;
   performing a baseline simulation on the computer of the software development process using the baseline simulation parameters and the bi-directional software development process simulation model to obtain baseline predictive performance data;
   performing a portion of the software development process to obtain updated development data;
   performing an updated simulation on the computer of the software development process using the updated development data and the bi-directional software development process simulation model to obtain updated predictive performance data;
   performing a reverse simulation on the computer of the software development process using the updated development data to determine software development stages where performance benefits can be achieved; and
   revising the software development process to achieve performance benefits.

17. The method of claim 16, wherein the bi-directional software development process simulation model further comprises a data repository which is configured to accept simulation parameters and simulation data.

18. The method of claim 16, wherein predictive simulation data comprises predictive performance data and requirements data.

19. The method of claim 16, wherein performing a reverse simulation comprises utilizing the reverse simulation equations and updated data to develop requirements data for each software development stage that has not been performed.

20. The method of claim 16, further comprising determining that the updated development data is outside of the outcome-based control limits.

* * * * *